(12) United States Patent
Fujimura

(10) Patent No.: US 8,665,353 B2
(45) Date of Patent: Mar. 4, 2014

(54) SOLID-STATE IMAGE PICKUP APPARATUS AND METHOD FOR DRIVING THE SAME

(75) Inventor: Masaru Fujimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 13/176,935

(22) Filed: Jul. 6, 2011

(65) Prior Publication Data
US 2012/0026363 A1  Feb. 2, 2012

(30) Foreign Application Priority Data

Jul. 30, 2010  (JP) ................................. 2010-172528

(51) Int. Cl.
*H04N 3/14* (2006.01)
*H04N 5/235* (2006.01)

(52) U.S. Cl.
USPC .......................... 348/302; 348/294; 348/222.1

(58) Field of Classification Search
USPC ...................................... 348/302, 294, 222.1
See application file for complete search history.

(56) References Cited

U.S. PATENT DOCUMENTS

| | | | |
|---|---|---|---|
| 6,960,751 B2 | 11/2005 | Hiyama et al. | |
| 7,429,764 B2 | 9/2008 | Koizumi et al. | |
| 7,547,871 B2 | 6/2009 | Hiyama et al. | |
| 7,679,658 B2 | 3/2010 | Sakurai et al. | |
| 7,808,537 B2 | 10/2010 | Fujimura et al. | |
| 7,948,540 B2 | 5/2011 | Ogura et al. | |
| 2006/0038902 A1* | 2/2006 | Boemler | 348/294 |
| 2008/0273093 A1 | 11/2008 | Okita et al. | |
| 2010/0149366 A1 | 6/2010 | Noda et al. | |
| 2011/0007173 A1* | 1/2011 | Takenaka et al. | 348/222.1 |
| 2011/0198482 A1 | 8/2011 | Ogura et al. | |

FOREIGN PATENT DOCUMENTS

JP  2009-213012 A  9/2009

* cited by examiner

*Primary Examiner* — Joel Fosselman
(74) *Attorney, Agent, or Firm* — Fitzpatrick, Cella, Harper & Scinto

(57) ABSTRACT

A solid-state image pickup apparatus has: a pixel area having unit pixels arranged in a two-dimensional matrix; a plurality of analog/digital converters, each provided for the unit pixels on the same column; a plurality of first/second memory units, provided to respective analog/digital converters, for storing the digital signals of one/another row; and a digital signal processing unit for generating an output signal based on the signals from the first and second memory units, wherein the first and second memory units store the digital signals of a same row at a non-addition operation and store the digital signals of different rows at an addition operation, and wherein, at the non-addition operation, if one of the first and second memory units on a same column is defective, the digital signal processing unit generates the output signal based on the signal from the other one of the units on the same column.

9 Claims, 8 Drawing Sheets

SOLID-STATE IMAGE PICKUP APPARATUS AND METHOD FOR DRIVING THE SAME

BACKGROUND OF THE INVENTION

1. Field of the Invention

The present invention relates to a solid-state image pickup apparatus and a method for driving the solid-state image pickup apparatus.

2. Description of the Related Art

In recent years, a desire for increasing the number of pixels and a frame rate of a solid-state image pickup apparatus has been increased and a high output rate is demanded for the solid-state image pickup apparatus. As a technique for meeting such a desire, a solid-state image pickup apparatus of a digital output type having A/D (analog/digital) converters provided for every column has been developed. As circuits provided for every column, besides the A/D converters, there are CDS (Correlation Double Sampling) circuits, PGA (Programmable Gain Amplifier) circuits, memory circuits such as SRAMs, latch circuits, counter circuits, and the like. Those circuits become complicated and the number of necessary devices increases. As the number of devices increases, an occurrence probability of defect caused by a manufacturing step increases and a manufacturing yield decreases. Particularly, the circuit defects existing on a column basis become a linear defect, which causes a large deterioration in picture quality and causes the manufacturing yield to decrease. As a technique for allowing the circuits to be used even if there are defects of the column circuits, Japanese Patent Application Laid-Open No. 2009-213012 discloses such a technique that redundant column circuits are provided for an analog circuit and a defective column is replaced by them.

In the related art, a solution for the defect of the digital circuit, in particular, the memory circuit unit is not discloses. As also disclosed in the Japanese Patent Application Laid-Open No. 2009-213012, the redundant circuits will not be used in a non-defective chip and thus occupy a chip area in an inefficient manner.

SUMMARY OF THE INVENTION

According to an aspect of the invention, there is provided a solid-state image pickup apparatus comprising: a pixel area in which unit pixels for generating signals by photoelectric conversion are arranged in a two-dimensional matrix; a plurality of analog/digital converters, each provided for the unit pixels on the same column, for converting analog signals output from the unit pixels into digital signals, respectively; a plurality of first memory units, each provided to respective analog/digital converters, for storing the digital signals derived from the pixel of one row that are converted by the respective one of plurality of analog/digital converters; a plurality of second memory units, each provided to respective analog/digital converters, for storing the digital signals derived from the pixel of another row that are converted by the respective one of plurality of analog/digital converters; and a digital signal processing unit for generating an output signal based on the signals from the first memory units and the signals from the second memory units, wherein the first memory units and the second memory units store the digital signals derived from the pixels of a same row at a non-addition operation and store the digital signals of different rows at an addition operation, and wherein, at the non-addition operation, when one of the first memory unit and the second memory unit on a target column is defective, the digital signal processing unit generates the output signal based on the signal from the other one of the first memory unit and the second memory unit on the same column.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
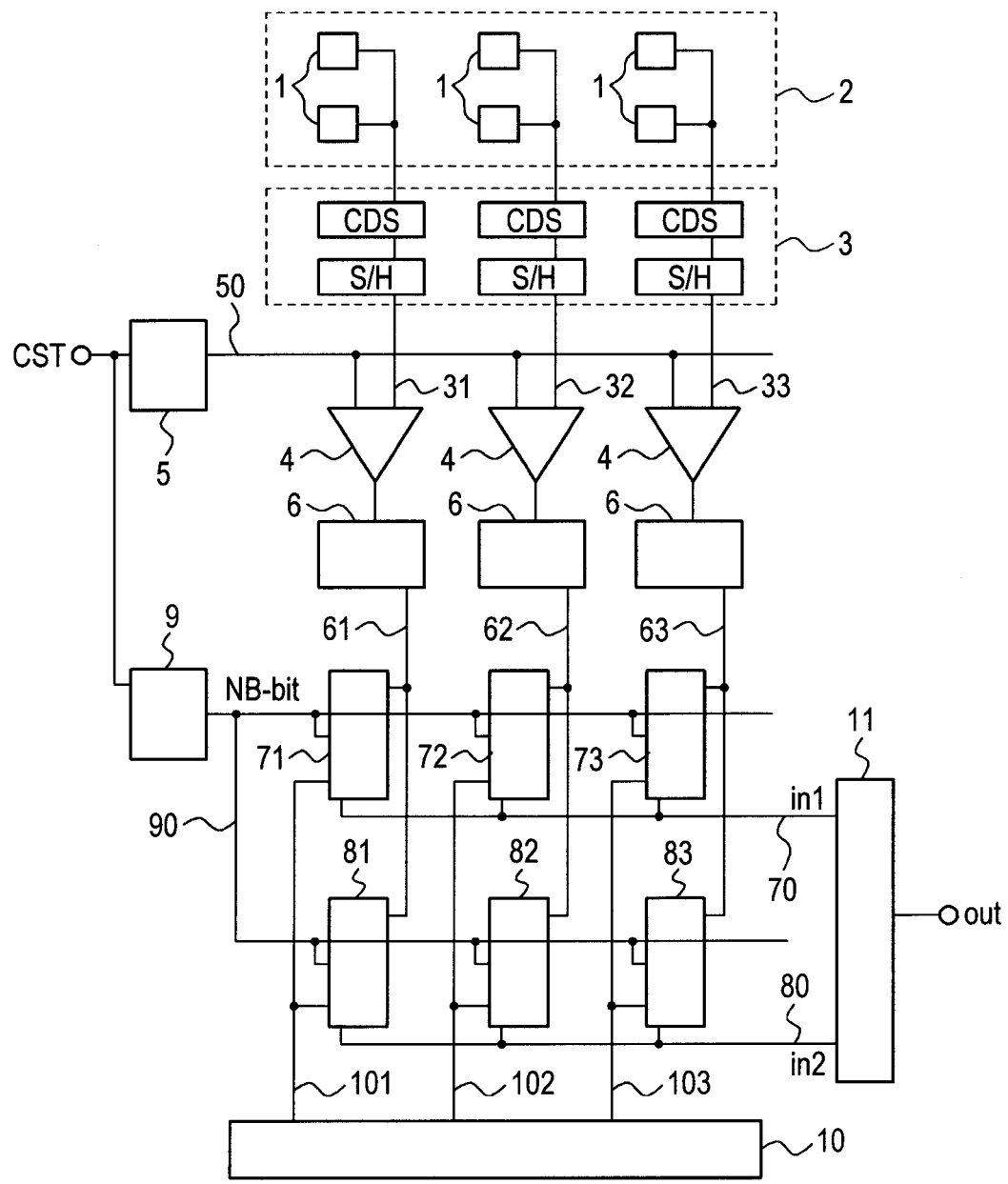
FIG. 1 is a block diagram of a solid-state image pickup apparatus of an example to be compared (hereafter, referred to as "Comparison").

First, a solid-state image pickup apparatus of Comparison will be described for better understanding of an embodiment of the invention and avoiding duplicated descriptions for portions similar to those in the embodiment of the invention. FIG. 1 is a block diagram of the solid-state image pickup apparatus of Comparison. The solid-state image pickup apparatus has a pixel area 2 in which unit pixels 1 are arranged in a two-dimensional matrix of H rows and N columns. In all of the following descriptions, it is assumed that the unit pixels 1 are arranged in a two-dimensional matrix of two rows and three columns. Each unit pixel 1 generates a signal by a photoelectric conversion by a photoelectric converting device. An analog signal processing unit 3 of each column has: a CDS circuit for fetching a optical signal of the unit pixel 1 only; and a sampling and holding circuit (S/H circuit) for holding an output of the CDS circuit and facilitating a signal input to a circuit at a post stage. A plurality of vertical signal lines 31 to 33 are provided every unit pixel 1 of the same column and the signals of the unit pixels 1 are output on a row unit basis. A ramp signal generator 5 generates a ramp signal 50 whose voltage changes in accordance with a predetermined slope. A comparing circuit 4 compares the ramp signal 50 that is common to all columns with each of the vertical signal lines 31, 32, and 33 of the analog signal processing unit 3 of each column. Latch circuits 6 are connected to outputs of the comparing circuits 4, output signals for a predetermined period after an inversion of a comparison result occurs, and supply fetching timing signals of data to first memory units 71, 72, and 73 of the first row and second memory units 81, 82, and 83 of the second row, respectively. Output lines 61, 62, and 63 are the output lines of digital fetching timing pulses generated by the latch circuits 6. A counter 9 performs a count-up operation of a binary number of a width of NB bits as an arbitrary number. A count signal 90 as an output of the counter 9 is connected in common to inputs of all of the memory units 71 to 73 and 81 to 83.

In each column, in response to the signals generated by the latch circuits 6, at the timing thereof, a digital output value of the count signal 90 is stored into the memory units 71 to 73 and 81 to 83 for a predetermined period of time just after the comparison result is inverted. Thus, analog signals of the vertical signal lines 31 to 33 are converted into digital values by the A/D (analog/digital) conversion and written into the memory units 71 to 73 and 81 to 83. The comparing circuit 4, ramp signal generator 5, latch circuit 6, and counter 9 make up an A/D (analog/digital) converter. The A/D converters are provided every unit pixel 1 of the same column and convert the analog signals of the plurality of vertical signal lines 31 to 33 into digital signals, respectively. The plurality of first memory units 71 to 73 are provided corresponding to a plurality of A/D converters and store the digital signals of one row converted by the plurality of A/D converters. The plurality of second memory units 81 to 83 are provided corresponding to the plurality of A/D converters and store the digital signals of one row converted by the plurality of A/D converters. A first common output line 70 to which output lines of the first memory units 71, 72, and 73 are connected in common and a second common output line 80 to which output lines of the second memory units 81, 82, and 83 are connected in common are connected to inputs of a digital signal processing unit 11. Signals from the first memory units 71 to 73 are sequentially output to the first common output line 70. Signals from the second memory units 81 to 83 are sequentially output to the second common output line 80. The data stored in the memory units 71 to 73 and 81 to 83 of each column is accessed by a horizontal address decoder 10, is sequentially transmitted to the digital signal processing unit 11, is subjected to a predetermined arithmetic operating process, and is then output as digital data from an output terminal "out". The digital signal processing unit 11 generates an output signal based on the signal of the first common output line 70 and the signal of the second common output line 80.

As mentioned above, FIG. 1 illustrates an arrangement having the memory units 71 to 73 and 81 to 83 of two rows in order to add the data of the first and second rows. While a relation with a plane array of color filters is not illustrated in FIG. 1, it is not necessary to be specified. For example, in a color solid-state image pickup apparatus of a Bayer array, while signals of the same color are added, in this case, data of two rows of every other row may be added instead of two continuous rows.

Figure 2:
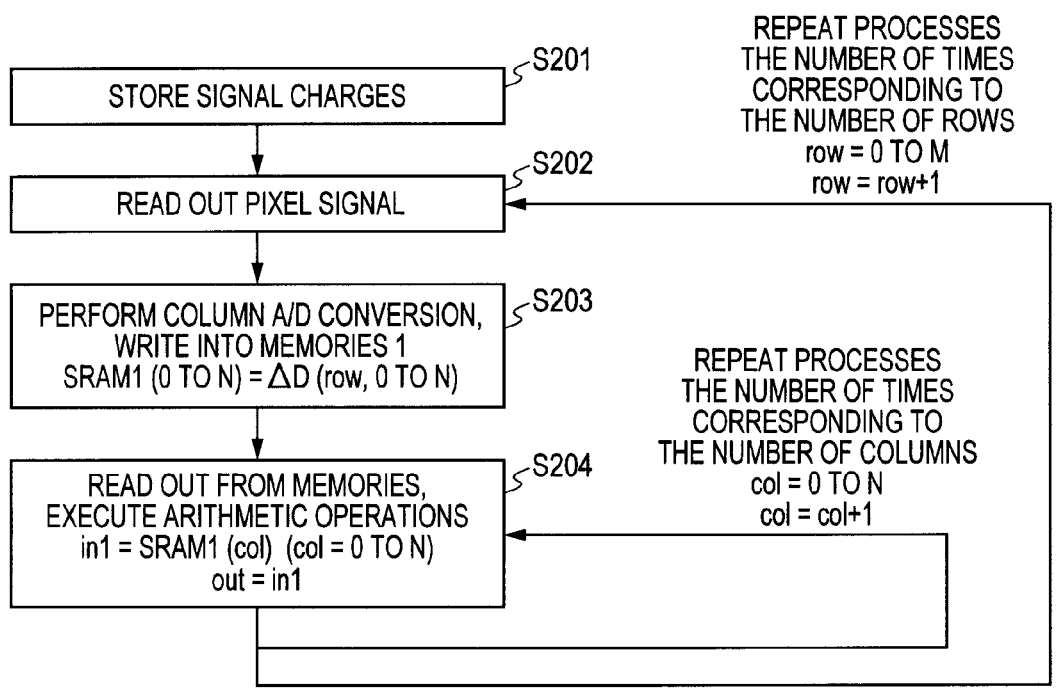
FIG. 2 is an operation flowchart for the non-adding operation of the solid-state image pickup apparatus of FIG. 1.

FIG. 2 is a flowchart illustrating the non-adding operation of the solid-state image pickup apparatus of FIG. 1. In step S201, signal charges generated by a photoelectric conversion are accumulated in the pixel area 2. Subsequently, in step S202, a pixel signal of one arbitrary row among the unit pixels 1 of the 2-dimensional array is read out. The analog signal processing unit 3 reduces noise components of the pixel signal read out in step S201 and reads out optical signals from the pixel area 2 in parallel with respect to all of the columns. In next step S203, the column A/D conversion is performed in parallel in all of the columns and digital conversion values of the optical signal components of respective columns are written into the memory units 71 to 73 and 81 to 83. The data SRAM1 to be written can be expressed by the following equation.

$$SRAM1(0{\sim}N)=\Delta D(\text{row},0{\sim}N)$$

SRAM1 is digital data held in the memory units 71, 72, and 73 of the first row and a suffix in the parentheses denotes a column position. Note that $\Delta D(\text{row}, \text{col})$ denotes a digital value obtained by converting the optical signal of each unit pixel 1 of the 2-dimensional array. Note that "row" denotes a row position and "col" denotes a column position.

Subsequently, in step S204, the horizontal address decoder 10 sequentially reads out the data in the memory units 71 to 73 with respect to each column. Assuming that "in1" denotes a data value of the input terminal of the digital signal processing unit 11 and "out" denotes a data value of the output terminal "out" of the digital signal processing unit 11, the data "in1" and "out" appearing at the input terminal and the output terminal "out" can be expressed by the following equations.

$$in1=SRAM1(\text{col})(\text{col}=0{\sim}N)$$

$$out=in1$$

The operations in steps S202 to S204 described above are repeated for M times (M denotes the number of rows of the pixel from which the signals are read out).

Figure 3:
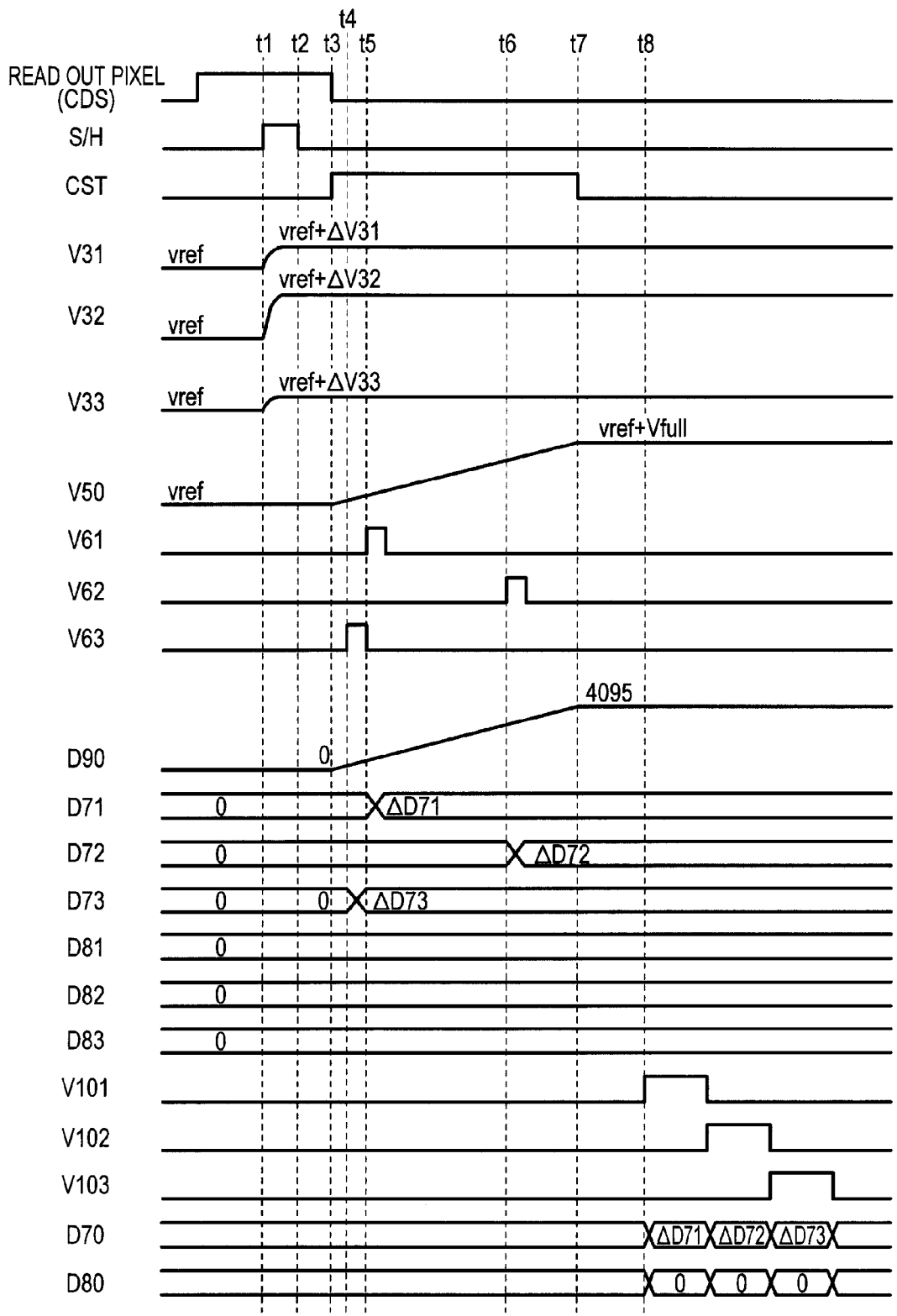
FIG. 3 is a driving timing chart for the non-adding operation of the solid-state image pickup apparatus of FIG. 1.

FIG. 3 is a diagram illustrating driving timing of the operation flow of FIG. 2. CDS denotes a signal which is set to the high level by the pixel reading operation of the CDS circuit in the analog signal processing unit 3. S/H denotes a pulse at which the sampling and holding circuit (S/H circuit) in the analog signal processing unit 3 samples and holds an output signal from the unit pixel 1. CST denotes a pulse signal showing an operation period of the counter 9 and the ramp signal generator 5. V31, V32, and V33 denote voltage waveforms of the signal lines 31, 32, and 33 of the analog signal processing unit 3. V50 denotes an electric potential waveform of the ramp signal 50. V61, V62, and V63 denote voltage waveforms of the output lines 61, 62, and 63 of the latch circuit 6. D90 denotes data in which the digital count value 90 of the counter 9 is expressed by a decimal number. D71 to D83 denote digital values held in the memory units 71 to 73 and 81 to 83. V101, V102, and V103 denote voltage waveforms of output signals 101, 102, and 103 of the horizontal address decoder 10. D70 and D80 denote digital values of the common output lines 70 and 80 of the memory units 71 to 73 and 81 to 83. As for the analog signals V31, V32, and V33, although a change amount of each signal is an arbitrary amount depending on the output signal of the unit pixel 1, a case where there is a relation of $\Delta V33<\Delta V31<\Delta V32$ among the voltage changes is shown as an example in FIG. 3.

At time t1, the signal S/H is set to the high level and the S/H circuit in the analog signal processing unit 3 starts the sampling of the optical signal from the unit pixel 1, so that the output signals V31, V32, and V33 of respective columns of the signal lines 31, 32, and 33 change by optical signal components $\Delta V31$, $\Delta V32$, and $\Delta V33$ of respective columns.

At time t2, the signal S/H is set to the low level, so that the S/H circuit holds the output signals V31, V32, and V33.

At time t3, the signal CST is set to the high level, the ramp voltage V50 rises in accordance with a predetermined slope, the count value D90 is counted up at predetermined timing, and the comparators 4 of respective columns start the comparison between the signals V31, V32, and V33 and the ramp voltage V50, respectively. The predetermined slope rises to Vfull as an output range allocated to an amplitude of the optical signal of the analog signal processing unit 3. The counted-up value increases up to the maximum value 4095 of the number of effective conversion bits (12 bits here) of the solid-state image pickup apparatus.

At time t4, a magnitude relation between the signal V33 of the third column and the ramp voltage V50 is inverted and the latch circuit 6 outputs a high-level signal of the digital value fetching timing signal V63 of a predetermined period of time. For this period of time, the memory unit 73 fetches the count value D90. The data at this time is a digital value obtained by converting the signal voltage ΔV33 and is expressed by ΔD(row, 3) in the expression of FIG. 2, that is, it is expressed by ΔD73.

Similarly, at time t5, a magnitude relation between the signal V31 of the first column and the ramp voltage V50 is inverted and the latch circuit 6 sets the digital value fetching timing signal V61 to the high level. The memory unit 71 fetches the count value D90 at this time. The data at this time is a digital value obtained by converting the signal voltage ΔV31 and is expressed by ΔD(row, 1) in the expression of FIG. 2, that is, it is expressed by ΔD71.

Similarly, at time t6, a magnitude relation between the signal V32 of the second column and the ramp voltage V50 is inverted and the latch circuit 6 sets the digital value fetching timing signal V62 to the high level. The memory unit 72 fetches the count value D90 at this time. The data at this time is a digital value obtained by converting the signal voltage ΔV32 and is expressed by ΔD(row, 2) in the expression of FIG. 2, that is, it is expressed by ΔD72. Subsequently, at time t7, the pulse CST is set to the low level, each of the ramp voltage V50 and the count value D90 of the counter 9 becomes the maximum values. The processes described above correspond to the processes of steps S202 and S203 in FIG. 2.

Subsequently, driving timing corresponding to step S204 in FIG. 2 will be described. At time t8, the horizontal address decoder 10 sets the address signal V101 of the first column to the high level. At this time, the value ΔD71 held in the memory unit 71 is output to the common output line 70 of the memory unit 71. A result of an arithmetic operation based on an arithmetic operation expression is output to the output terminal "out". In a manner similar to the above, the values ΔD72 and ΔD73 held in the memory units 72 and 73 are output to the common output line 70 in response to the address signals V102 and V103 and arithmetic operation results are output to the output terminal "out".

Figure 4:
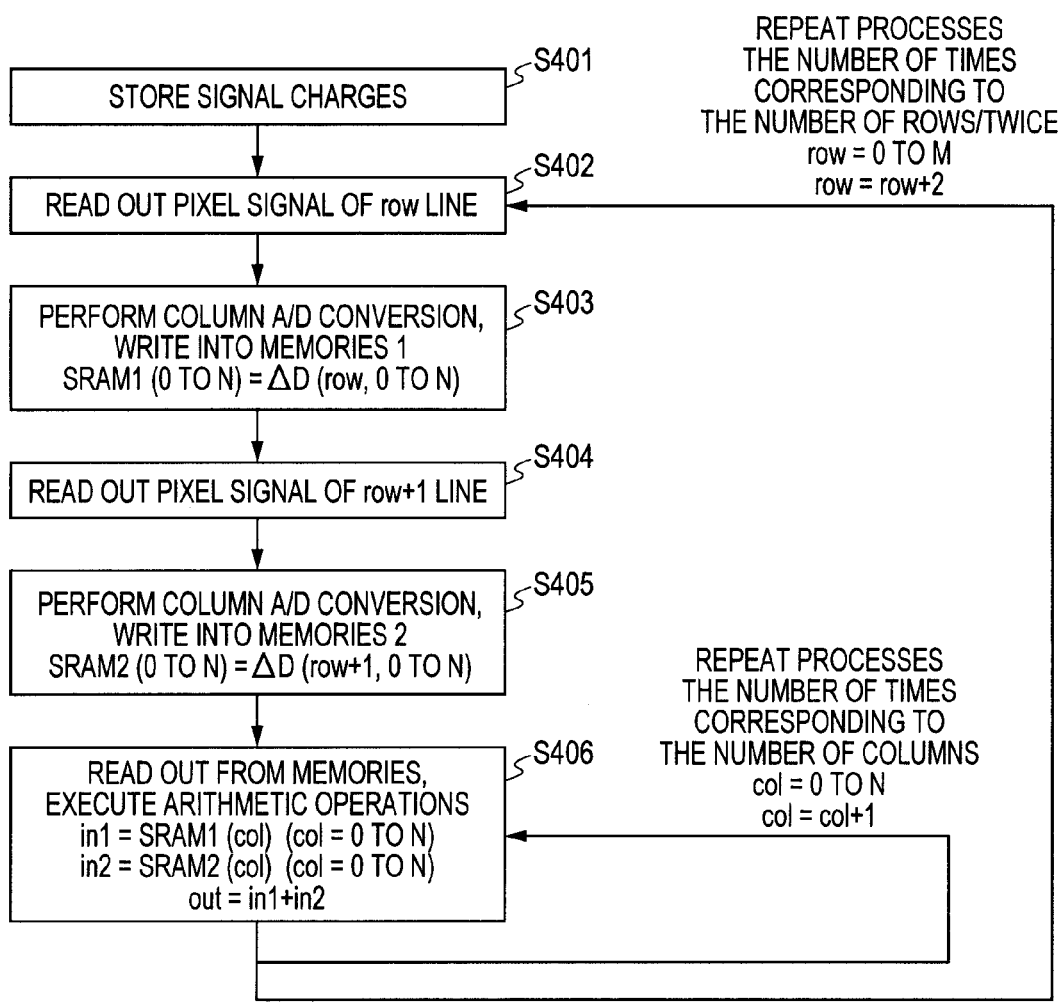
FIG. 4 is an operation flowchart for the adding operation of the solid-state image pickup apparatus of FIG. 1.

FIG. 4 is a flowchart illustrating the adding operation of the solid-state image pickup apparatus of FIG. 1. First, the solid-state image pickup apparatus executes processes of steps S401 to S403. Steps S401 to S403 are substantially the same as the processes of steps S201 to S203 of FIG. 2. Subsequently, in step S404, the pixel signal of the next row of one arbitrary odd-number row selected in step S402 among the unit pixels 1 of the 2-dimensional array is read out. The analog signal processing unit 3 reads out the optical signals from the pixel area 2 in parallel with respect to all of the columns. In next step S405, the column A/D conversion is performed in parallel in all of the columns and digital conversion values of the optical signals of respective columns are written into the memory units 81, 82, and 83. Data SRAM2 to be written can be expressed by the following equation. SRAM2 denotes digital values held in the memory units 81, 82, and 83 of the second row.

$$SRAM2(0\sim N)=\Delta D(row+1,0\sim N)$$

Subsequently, in step S406, the horizontal address decoder 10 sequentially reads out the data in the memory units 71 to 73 and 81 to 83 with respect to respective columns and outputs onto the common output lines 70 and 80. Note that "in1" denotes the data value of the input terminal of the digital signal processing unit 11, "in2" denotes the data value of another input terminal of the digital signal processing unit 11, and "out" denotes the data value of the output terminal "out" of the digital signal processing unit 11. The data "in1", "in2", and "out" appearing at the input terminals and the output terminal "out" can be expressed by the following equations.

$$in1=SRAM1(col)(col=0\sim N)$$

$$in2=SRAM2(col)(col=0\sim N)$$

$$out=in1+in2$$

The digital signal processing unit 11 outputs an addition value of the data "in1" of the first row and the data "in2" of the second row to the output terminal "out". An arithmetic operation about the column position "col" is repetitively executed from 0 to N. The operations of steps S402 to S406 are repeated for M/2 times (M denotes the number of rows of the pixel from which the signals are read out).

Figure 5:
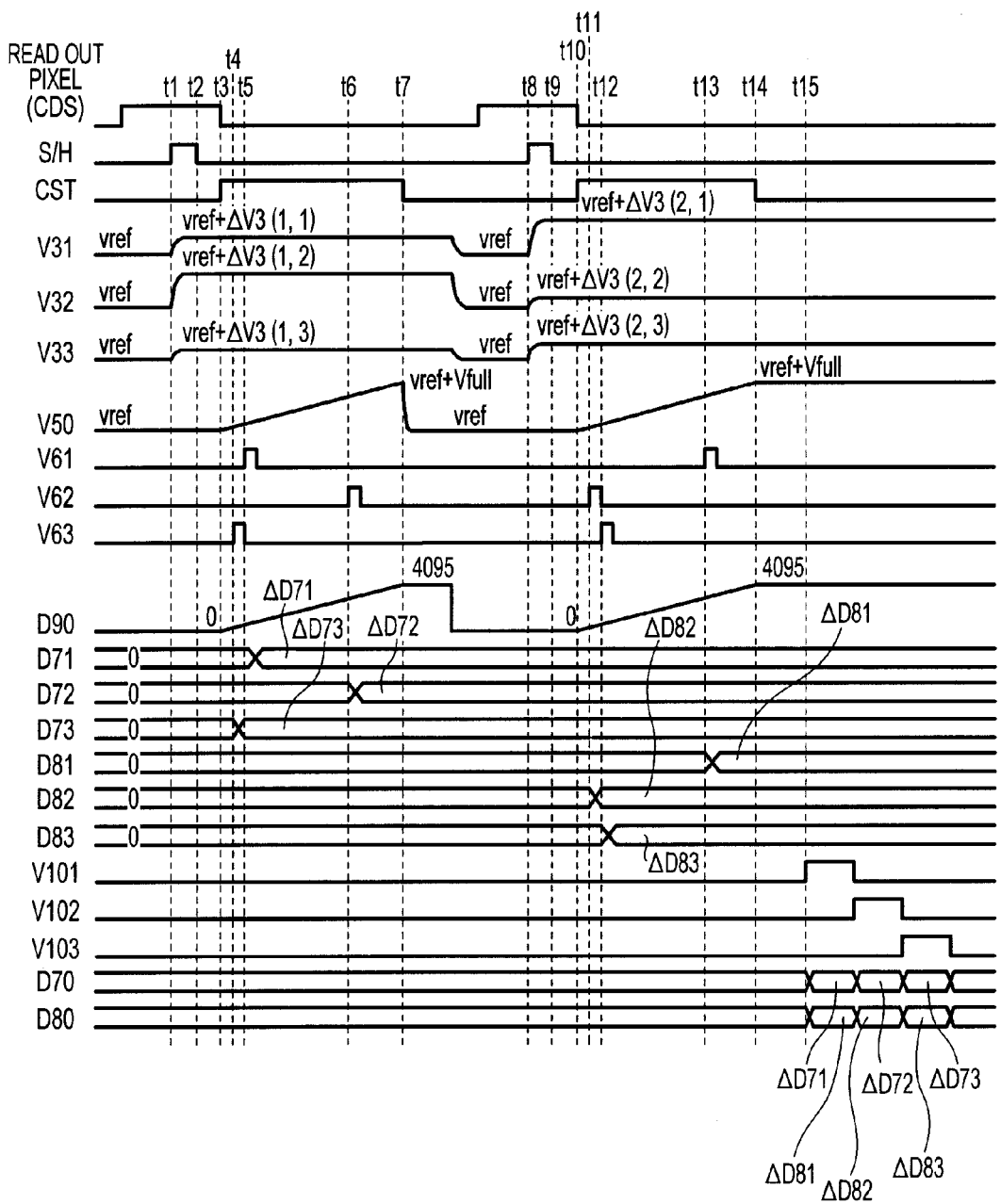
FIG. 5 is a driving timing chart for the adding operation of the solid-state image pickup apparatus of FIG. 1.

FIG. 5 is a timing chart illustrating driving timing for the operation flow of FIG. 4. Terminal names of pulses are substantially the same as those in FIG. 3. The operations executed at time t1 to t7 are the operations of the first row. The operations executed at time t8 to t15 are the operations of the second row. At timing of the first row at time t4, t5, and t6, the data is written into the memory units 71, 72, and 73 of the first row. At timing at time t11, t12, and t13, the data is written into the memory units 81, 82, and 83 of the second row. The change amount of each analog signal is merely illustrated as an example and is not limited to the following value.

The operations executed at time t1 to t7 are substantially the same as those in FIG. 3. However, at time t7, the ramp voltage V50 is reset to an electric potential Vref. Between time t7 and time t8, the output signals V31, V32, and V33 of the analog signal processing unit 3 are reset to the electric potential Vref. The digital count value of the counter 9 is reset to 0.

At time t8, the signal S/H is set to the high level and the S/H circuit in the analog signal processing unit 3 starts the sampling of the optical signal from the unit pixel 1. Thus, the output signals V31, V32, and V33 of respective columns of the signal lines 31, 32, and 33 change by optical signal components ΔV3(2, 1), ΔV3(2, 2), and ΔV3(2, 3) of respective columns.

At time t9, the S/H circuit in the analog signal processing unit 3 holds the output signals V31, V32, and V33. At time t10, the signal CST is set to the high level, the ramp voltage V50 rises, the count value D90 is counted up, and the comparators 4 of respective columns start the comparison between the signals V31, V32, and V33 and the ramp voltage V50, respectively.

At time t11, a magnitude relation between the signal V32 of the second column and the ramp voltage V50 is inverted and the latch circuit 6 sets the digital value fetching timing signal V62 to the high level. For this period of time, the memory unit 82 fetches the count value D90. The data at this time is a digital value obtained by converting the signal voltage ΔV3 (2, 2) and is expressed by ΔD(row+1, 2) in the expression of FIG. 4, that is, it is expressed by ΔD82.

Similarly, at time t12, a magnitude relation between the signal V31 of the first column and the ramp voltage V50 is inverted and the latch circuit 6 sets the digital value fetching timing signal V61 to the high level. The memory unit 81 fetches the count value D90. The data at this time is a digital value obtained by converting the signal voltage ΔV3(2, 1) and is expressed by ΔD(row+1, 1) in the expression of FIG. 4, that is, it is expressed by ΔD81.

Similarly, at time t13, a magnitude relation between the signal V33 of the third column and the ramp voltage V50 is inverted and the latch circuit 6 sets the digital value fetching timing signal V63 to the high level. The memory unit 83 fetches the count value D90. The data at this time is a digital value obtained by converting the signal voltage ΔV3(2, 3) and is expressed by ΔD(row+1, 3) in the expression of FIG. 4, that is, it is expressed by ΔD83.

At time t14, the signal CST is set to the low level and each of the ramp voltage V50 and the count value D90 of the counter 9 becomes the maximum value.

Subsequently, at time t15, the horizontal address decoder 10 sets the address signal V101 of the first column to the high level. At this time, the value ΔD71 held in the memory unit 71 is output to the common output line 70 of the memory unit 71 and the value ΔD81 held in the memory unit 81 is output to the common output line 80 of the memory unit 81. The digital signal processing unit 11 outputs an addition result according to an arithmetic operation expression to the output terminal "out". In a manner similar to the above, the values ΔD72, ΔD73, ΔD82, and ΔD83 held in the memory units 72, 73, 82, and 83 are output to the common output lines 70 and 80, and an addition result is output to the output terminal "out".

In the foregoing solid-state image pickup apparatus of Comparison, assuming that, for example, the memory unit 72 is defective and the output is fixed to zero, in the output of the second column, a black vertical line scratch without any output occurs in an image at the time of a non-addition, while a vertical line scratch in which an output is darker than that of a periphery occurs at the time of an addition.

Figure 6:
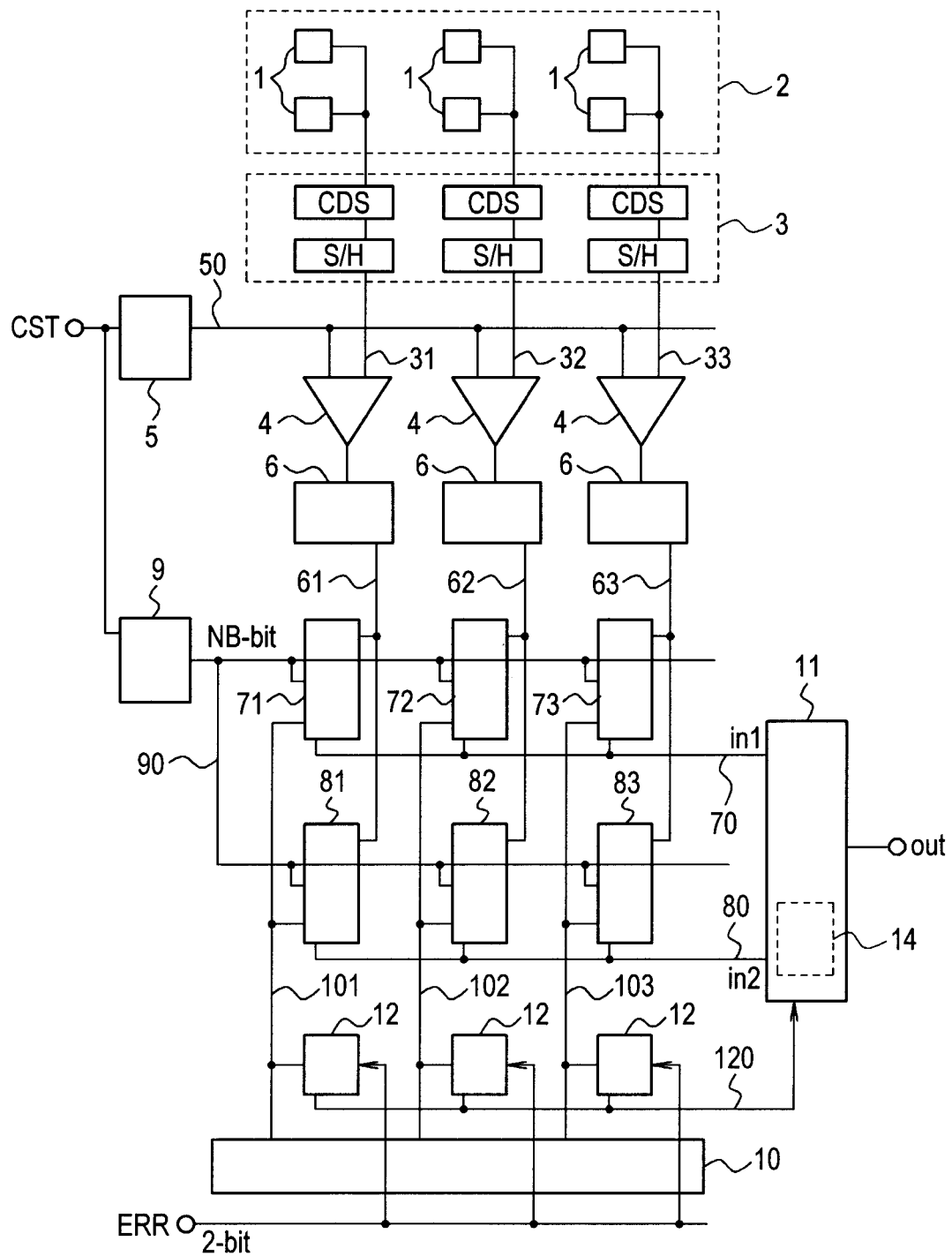
FIG. 6 is a block diagram of a solid-state image pickup apparatus according to an embodiment.

FIG. 6 is a block diagram illustrating an arrangement example of a solid-state image pickup apparatus according to an embodiment of the invention. The elements with the same reference numerals have the similar arrangements to those in FIG. 1 as a diagram of the solid-state image pickup apparatus of Comparison. The feature of the construction of FIG. 6 is that the apparatus has the same number of defect storing units 12 as the number of columns to store a defect flag (information) indicating whether the first memory units 71 to 73 and the second memory units 81 to 83 are normal or defective. The flag in each defect storing unit 12 is formed with two bits. The first bit is a flag F0 indicating whether or not there is a defect in the memory units 71 to 73 and 81 to 83 of the relevant column. The second bit is a flag F1 indicating, if there is a defect, in which ones of the memory units 71, 72, and 73 of the first row and the memory units 81, 82, and 83 of the second row the defect exists. Output terminals of the defect storing units 12 of all columns are connected to a common output line 120. The common output line 120 is connected to the input of the digital signal processing unit 11. The defect storing units 12 have an input terminal ERR to write defect information. The digital signal processing unit 11 determines whether the first memory units 71 to 73 or the second memory units 81 to 83 are normal or defective based on the defect flags in the defect storing units 12. The digital signal processing unit 11 has therein a read-out memory designating circuit 14 for changing a combination of the signals used in the arithmetic operations among a plurality of signals of the input terminals in accordance with the flags in the defect storing units 12.

Figure 7:
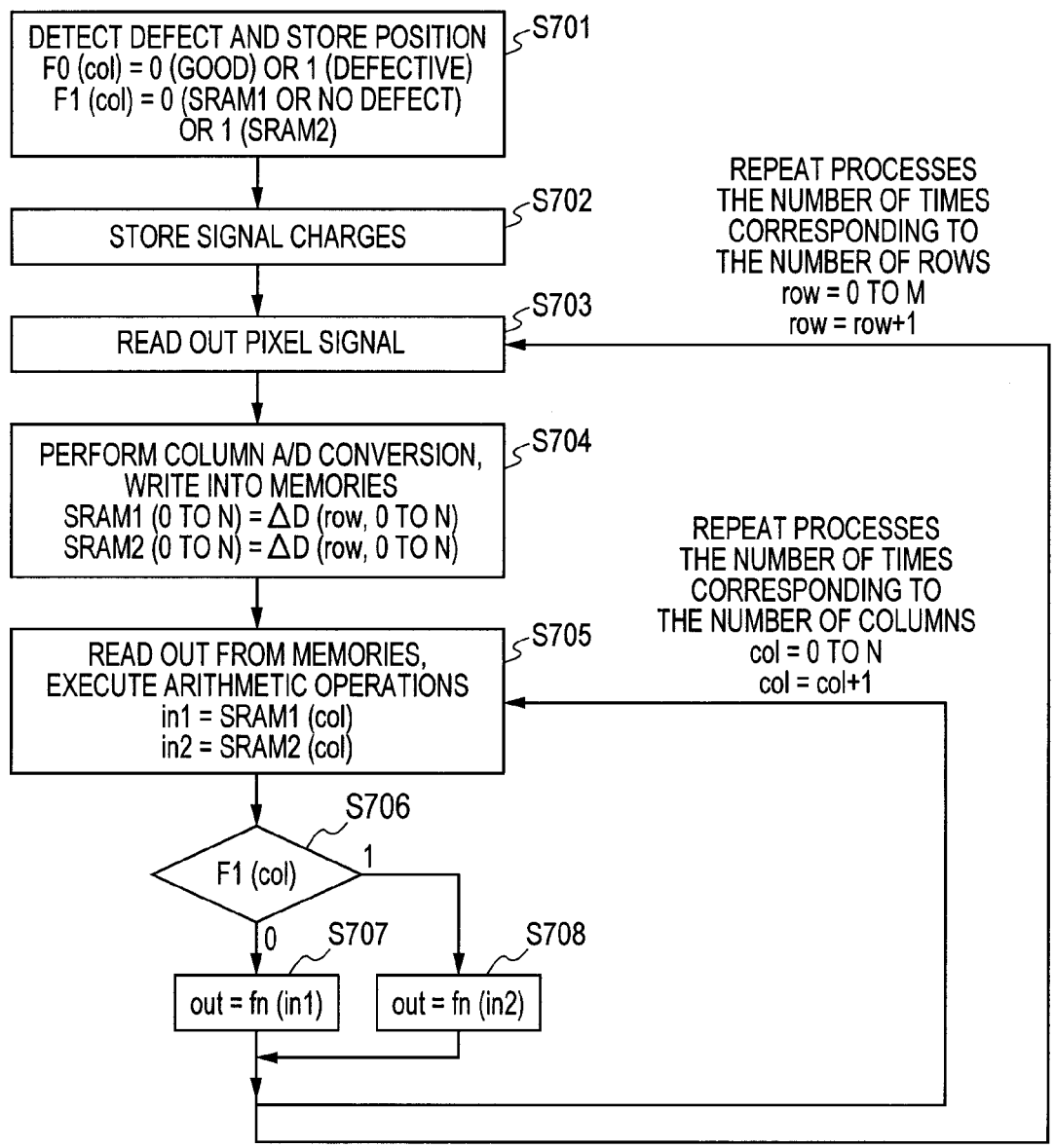
FIG. 7 is an operation flowchart for the non-adding operation of the solid-state image pickup apparatus of FIG. 6.

FIG. 7 is a flowchart illustrating the non-adding operation of the solid-state image pickup apparatus of FIG. 6. Before the solid-state image pickup apparatus of the embodiment starts operation, in step S701, the defects of the memory units 71 to 73 and 81 to 83 are detected in advance. In step S701, based on a result of the defect detection, in an arbitrary "col" column, if the defect exists in any of the memory units 71 to 73 and 81 to 83 of two rows, F0(col)=1 is written into the defect storing unit 12. If they are normal, F0(col)=0 is written. If the defective portion is the memory units 81, 82, and 83 of the second row, F1(col)=1 is written. If the defective portion is the memory units 71, 72, and 73 of the first row or no defect exists, F1(col)=0 is written into the defect storing unit 12.

Subsequently, the solid-state image pickup apparatus executes processes of steps S702 and S703. Steps S702 and S703 are the same as the processes of steps S201 and S202 in FIG. 2.

Subsequently, in step S704, the column A/D conversion is performed in parallel in all of the columns and digital conversion values of the optical signal components of respective columns are written into the memory units 71 to 73 and 81 to 83. The data SRAM1 and SRAM2 to be written can be expressed by the following equation.

$$SRAM1(0\sim N)=SRAM2(0\sim N)=\Delta D(\text{row}, 0\sim N)$$

SRAM1 is the digital value held in the memory units 71, 72, and 73 of the first row, SRAM2 is the digital value held in the memory units 81, 82, and 83 of the second row, and a suffix in the parentheses denotes the column position. ΔD(row, col) denotes the digital value obtained by converting the optical signal of each unit pixel 1 of the 2-dimensional array. "row" denotes the row position and "col" denotes the column position. As mentioned above, the same data is written into the memory units 71 to 73 of the first row and the memory units 81 to 83 of the second row on the same column.

Subsequently, in step S705, the data SRAM1 and SRAM2 in the memory units 71 to 73 and 81 to 83 are sequentially read out. The data in1 and in2 of the input terminals can be expressed by the following equations.

$$in1=SRAM1(\text{col})$$

$$in2=SRAM2(\text{col})$$

Subsequently, in steps S706 to S708, the digital signal processing unit 11 outputs the signal to the output terminal "out" by the following operations which is controlled by the read-out memory designating circuit 14 in FIG. 6.

If the defect flag F1(col)=0, out=in1
If the defect flag F1(col)=1, out=in2

By those operations, in the normal column, the data in the memory units 71 to 73 of the first row is output to the output terminal "out", while, in the column in which the memory units 71 to 73 of the first row are defective, the data in the memory units 81 to 83 of the second row is output. An arithmetic operation about the column position "col" is repetitively executed from 0 to N.

The processes of steps S703 to S708 are repeated for M times (M denotes the number of rows of the pixel from which the signals are read out). According to the above operation, even in the column having the defect in the memory units, at the time of the non-addition, the use of the data in the memory units 81 to 83 of the second row that is not being used allows the normal operation to be performed and the yield of the solid-state image pickup apparatus can be improved.

Figure 8:
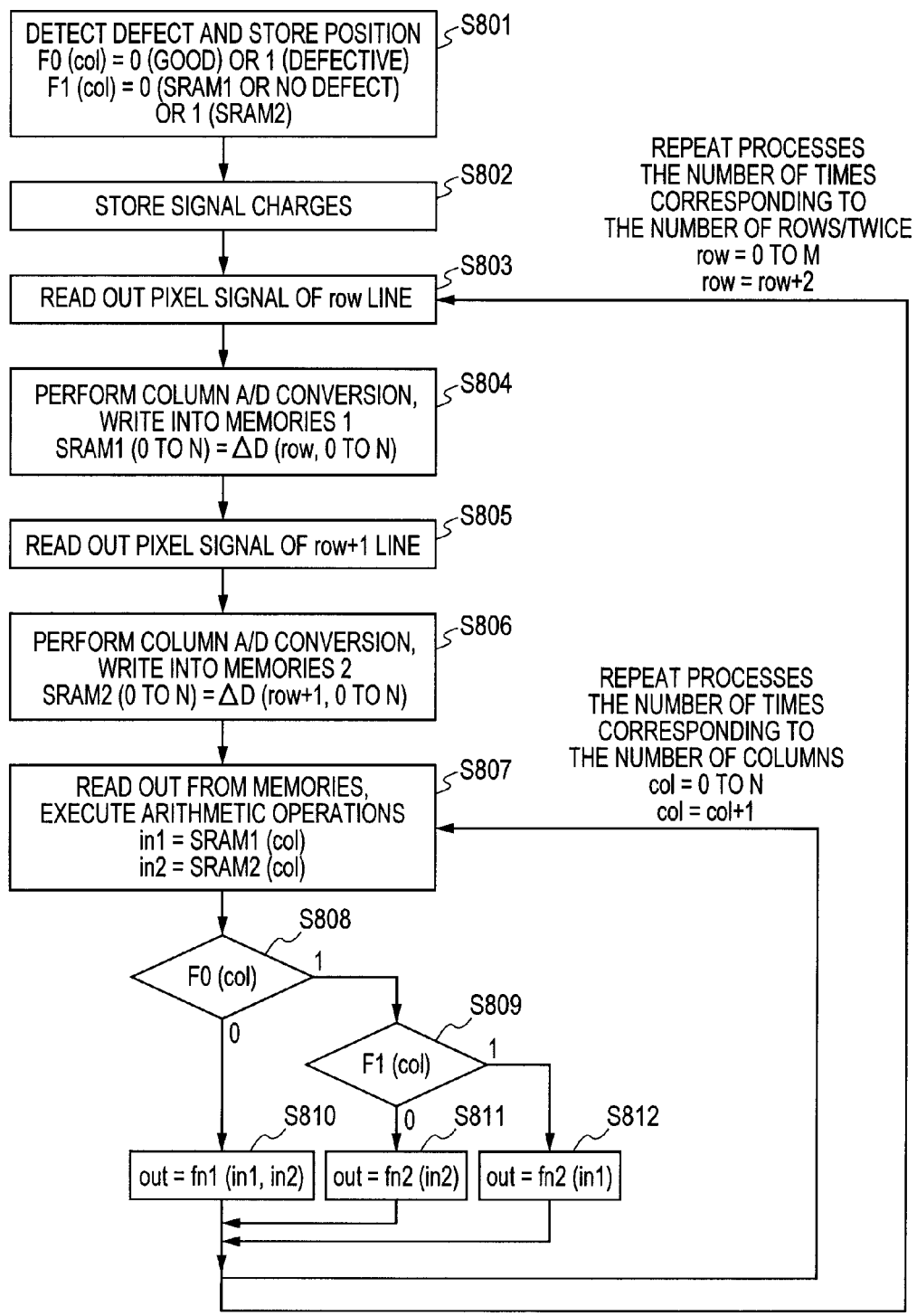
FIG. 8 is an operation flowchart for the adding operation of the solid-state image pickup apparatus of FIG. 6.

FIG. 8 is a flowchart illustrating the adding operation of the solid-state image pickup apparatus in FIG. 6. First, the solid-state image pickup apparatus executes processes of steps S801 to S806. Step S801 is the same as the process of step S701 in FIG. 7. Steps S802 to S806 are the same as the processes of steps S401 to S405 in FIG. 4. The data SRAM1 in the memory units 71 to 73 and the data SRAM2 in the memory units 81 to 83 are expressed by the following equations.

$$SRAM1(0\sim N)=\Delta D(\text{row}, 0\sim N)$$

$$SRAM2(0\sim N)=\Delta D(\text{row}+1, 0\sim N)$$

Subsequently, in step S807, the data SRAM1 and SRAM2 in the memory units 71 to 73 and 81 to 83 are sequentially read out with respect to respective columns. The data "in1" and "in2" of the common output lines 70 and 80 are expressed by the following equations.

in1=SRAM1(col)

in2=SRAM2(col)

Subsequently, in steps S808 to S812, the digital signal processing unit 11 outputs the signal at the output terminal "out" by the operations of the following equations which are controlled by the read-out memory designating circuit 14.

If the defect flag F0(col)=0, out=fn1(in1, in2)
If the defect flag F0(col)=1, the operation conforms with the following conditions.
If the defect flag F1(col)=0, out=fn2(in2)
If the defect flag F1(col)=1, out=fn2(in1)
Where, fn1(a, b) is a function of two inputs of a and b and fn1=a+b. fn2(c) is a function of c and fn2=c×2.

Thus, in the normal column, addition data of the data in1 in the memory units 71 to 73 of the first row and the data in2 in the memory units 81 to 83 of the second row is output. In the column in which the memory units 71 to of the first row are defective, a value obtained by doubling the data in2 in the memory units 81 to 83 of the second row is output to the output terminal "out". In the column in which the memory units 81 to 83 of the second row are defective, a value obtained by doubling the data in1 in the memory units 71 to 73 of the first row is output to the output terminal "out". An arithmetic operation about the column position "col" is repeatedly executed from 0 to N.

The processes of steps S803 to S812 are repeated for M times (M denotes the number of rows of the pixel from which the signals are read out). According to the embodiment, by storing the defects of the memory units 71 to 73 and 81 to 83 into the defect storing units 12 and by selectively using the memory units 71 to 73 and the memory units 81 to 83 in the adding operation and the non-adding operation, respectively, in accordance with the values in the defect storing units 12, both of those operations can be well performed without having the redundant memories.

As described above, the first memory units 71 to 73 and the second memory units 81 to 83 store the digital signals of the same row at the time of the non-addition (FIG. 7) and store the digital signals of the different rows at the addition operation (FIG. 8).

At the non-addition operation (FIG. 7), if the first memory units 71 to 73 and the second memory units 81 to 83 on the target column are normal, the digital signal processing unit 11 generates the output signal based on the signals of the first memory units 71 to 73 of the target column or the signals of the second memory units 81 to 83 of the target column. At the non-addition operation (FIG. 7), if any one of the first memory units 71 to 73 and the second memory units 81 to 83 on the target column is defective, the digital signal processing unit 11 generates the output signal based on the signal of the other one of the first memory units 71 to 73 and the second memory units 81 to 83 on the target column.

At the addition operation (FIG. 8), if the first memory units 71 to 73 and the second memory units 81 to 83 on the target column are normal, the digital signal processing unit 11 adds the signal of the first memory units 71 to 73 on the target column and the signal of the second memory units 81 to 83 on the target column to generate the addition signal. At the addition operation (FIG. 8), if any one of the first memory units 71 to 73 and the second memory units 81 to 83 on the target column is defective, the digital signal processing unit 11 amplifies, for example, doubles the signal of the other one of the first memory units 71 to 73 and the second memory units 81 to 83 on the target column to generate the output signal.

According to the above operations, even in the column having the defect in the memory units 71 to 73 and 81 to 83, the interpolating operation can be made by the use of the data of the memory unit on the side having no defect in the memory units 71 to 73 and 81 to 83 of two rows, which improves the yield of the solid-state image pickup apparatus.

Another interpolating method can be applied by changing the control of the read-out memory designating circuit 14 as follows.

If the defect flag F0(col)=0, out=fn1(in1, in2)
If the defect flag F0(col)=1, the operation conforms with the following conditions.
If the defect flag F1(col)=0, out=fn3(in2, in1L, in1R)
If the defect flag F1(col)=1, out=fn3(in1, in2L, in2R)
Where, in1L denotes an output value of the first row of the left neighboring column of the read-out column, and in1R denotes an output value of the first row of the right neighboring column. Note that in2L denotes an output value of the second row of the left neighboring column of the read-out column, and in2R denotes an output value of the second row of the right neighboring column.

Further, fn3(d, e, f) is a function of three inputs of d, e, and f and is expressed by fn3=d+(e+f)/2. Thus, in the normal column, an addition value of the data in1 of the memory units 71 to 73 of the first row and the data in2 of the memory units 81 to 83 of the second row is output. In the column having defective memory units 71 to 73 on the first row, a value obtained by adding an average value of the output values in1L and in1R of both of the neighboring columns of the relevant column of the first row and the data in2 of the memory units 81 to 83 of the second row is output to the output terminal "out". In the column having defective memory units 81 to 83 on the second row, a value obtained by adding an average value of the output values in2L and in2R of both of the neighboring columns of the relevant column of the second row and the data in1 of the memory units 71 to 73 of the first row is output to the output terminal "out".

At the addition operation (FIG. 8), if the first memory unit 72 on the target column is defective, the digital signal processing unit 11 adds an average value of the signals of the first memory units 71 and 73 on a plurality of columns both neighboring the first memory unit 72 on the target column and the signal of the second memory unit 82 on the target column to generate the output signal. At the addition operation (FIG. 8), if the second memory unit 82 on the target column is defective, the digital signal processing unit 11 adds an average value of the signals of the second memory units 81 and 83 on a plurality of columns both neighboring the second memory unit 82 on the target column and the signal of the first memory unit 72 of the target column to generate the output signal.

According to the above operations, even in the column in which the defect exists, the interpolating operation can be made by the use of the data of the memory units on the row having no defect in the memory units 71 to and 81 to 83 of two rows and the data from both neighboring memory units on the row having the defect. Thus, the yield of the solid-state image pickup apparatus is improved. In other words, even if the defect exists in the first memory units or the second memory units, the deterioration in picture quality can be prevented without causing an increase in chip area due to the implementation of the redundant circuits. Therefore, the manufacturing yield of the solid-state image pickup apparatus can be improved.

According to the foregoing various embodiments, at the addition operation (FIG. 8), if there is a defect in the first memory units 71 to 73 on the target column, the digital signal processing unit 11 generates the output signal based on at least the signals from the second memory units 81 to 83 on the target column. At the addition operation (FIG. 8), if there is a defect in the second memory units 81 to 83 on the target column, the digital signal processing unit 11 generates the output signal based at least on the signals from the first memory units 71 to 73 on the target column.

While the defect storing unit 12 has been arranged in the solid-state image pickup apparatus in the embodiment, it may be arranged in a circuit for processing the output signal of the solid-state image pickup apparatus. The solid-state image pickup apparatus of the embodiment can be used as a solid-state image pickup apparatus used in a digital still camera or can be used as a solid-state image pickup apparatus used in what is called an image pickup apparatus for obtaining an image such as digital cam coder, monitoring camera, and the like.

The foregoing embodiments have merely been shown as specific examples when embodying the invention, and therefore the technical scope of the invention must not be limitatively interpreted by them. That is, the invention can be embodied as various kinds of modifications without departing from its technical concept or its main features.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-172528, filed Jul. 30, 2010, which is hereby incorporated by reference herein in its entirety.

What is claimed is:

1. A solid-state image pickup apparatus comprising:
a pixel area in which unit pixels for generating signals by photoelectric conversion are arranged in a two-dimensional matrix;
a plurality of analog/digital converters, each provided for the unit pixels on a same column, for converting analog signals output from the unit pixels into digital signals, respectively;
a plurality of first memory units, each provided to respective analog/digital converters, for storing the digital signals derived from the pixel of one row that are converted by the respective one of plurality of analog/digital converters;
a plurality of second memory units, each provided to respective analog/digital converters, for storing the digital signals derived from the pixel of another row that are converted by the respective one of plurality of analog/digital converters; and
a digital signal processing unit for generating an output signal based on the signals from the first memory units and the signals from the second memory units,
wherein the first memory units and the second memory units store the digital signals derived from the pixels of a same row at a non-addition operation and store the digital signals of different rows at an addition operation, and
wherein, at the non-addition operation, when one of the first memory unit and the second memory unit on a target column is defective, the digital signal processing unit generates the output signal based on the signal from the other one of the first memory unit and the second memory unit on the same column.

2. The apparatus according to claim 1, wherein at the addition operation, when one of the first memory unit and the second memory unit on the same column is defective, the digital signal processing unit adds an average value of the signals from the first memory units or the second memory units on a plurality of columns adjacent to the same column and the signals from the other one of the first memory unit and the second memory unit on the same column to generate the output signal.

3. The apparatus according to claim 1, further comprising a defect storing unit for storing information indicating whether the plurality of first memory units and the plurality of second memory units are normal or defective, and
wherein, based on the information in the defect storing unit, the digital signal processing unit determines whether the first memory units or the second memory units are normal or defective.

4. A solid-state image pickup apparatus comprising:
a pixel area in which unit pixels for generating signals by photoelectric conversion are arranged in a two-dimensional matrix;
a plurality of analog/digital converters, each provided for the unit pixels on a same column, for converting analog signals output from the unit pixels into digital signals, respectively;
a plurality of first memory units, each provided to respective analog/digital converters, for storing the digital signals derived from the pixel of one row that are converted by the respective one of plurality of analog/digital converters;
a plurality of second memory units, each provided to respective analog/digital converters, for storing the digital signals derived from the pixel of another row that are converted by the respective one of plurality of analog/digital converters; and
a digital signal processing unit for generating an output signal based on the signals from the first memory units and the signals from the second memory units,
wherein the first memory units and the second memory units store the digital signals derived from the pixels of a same row at a non-addition operation and store the digital signals of different rows at an addition operation, and
wherein, at the addition operation, when ones of the first memory unit and the second memory unit on a same column is defective, the digital signal processing unit generates the output signal based at least on the signal from the other one of the first memory unit and the second memory unit on the same column.

5. The apparatus according to claim 4, wherein at the addition operation, when one of the first memory unit and the second memory unit of the same column is defective, the digital signal processing unit amplifies the signal from the other one of the first memory unit and the second memory unit on the same column to generate the output signal.

6. The apparatus according to claim 4, wherein at the addition operation, when one of the first memory unit and the second memory unit of the same column is defective, the digital signal processing unit adds an average value of the signals from the first memory units or the second memory units of a plurality of columns adjacent to the same column and the signal of the other one of the first memory unit and the second memory unit on the same column to generate the output signal.

7. The apparatus according to claim 4, further comprising a defect storing unit for storing information indicating whether the plurality of first memory units and the plurality of second memory units are normal or defective, and
  wherein, based on the information in the defect storing unit, the digital signal processing unit determines whether the first memory units or the second memory units are normal or defective.

8. A method for driving a solid-state image pickup apparatus having
  a pixel area in which unit pixels for generating signals by photoelectric conversion are arranged in a two-dimensional matrix; and
  a plurality of analog/digital converters, each provided for the unit pixels on a same column, for converting analog signals output from the unit pixels into digital signals, respectively,
  wherein the solid-state image pickup apparatus has
  a plurality of first memory units, each provided to respective analog/digital converters, for storing the digital signals derived from the respective one of one row that are converted by the plurality of analog/digital converters;
  a plurality of second memory units, each provided to respective analog/digital converters, for storing the digital signals derived from the pixel of another row that are converted by the respective one of plurality of analog/digital converters; and
  a digital signal processing unit for generating an output signal based on the signals from the first memory units and the signals from the second memory units, and
  the method comprising:
  allowing the first memory units and the second memory units to store the digital signals derived from the pixels of a same row at a non-addition operation and to store the digital signals of different rows at an addition operation; and
  at the non-addition operation, when one of the first memory unit and the second memory unit on a same column is defective, allowing the digital signal processing unit to generate the output signal based on the signal from the other one of the first memory unit and the second memory unit on the same column.

9. A method for driving a solid-state image pickup apparatus having
  a pixel area in which unit pixels for generating signals by photoelectric conversion are arranged in a two-dimensional matrix;
  a plurality of analog/digital converters, each provided for the unit pixels on a same column, for converting analog signals output from the unit pixels into digital signals, respectively,
  wherein the solid-state image pickup apparatus has
  a plurality of first memory units, each provided to respective analog/digital converters, for storing the digital signals derived from the respective one of one row that are converted by the plurality of analog/digital converters;
  a plurality of second memory units, each provided to respective analog/digital converters, for storing the digital signals derived from the pixel of another row that are converted by the respective one of plurality of analog/digital converters; and
  a digital signal processing unit for generating an output signal based on the signals from the first memory units and the signals from the second memory units, and
  the method comprising:
  allowing the first memory units and the second memory units to store the digital signals derived from the pixel of a same row at a non-addition operation and to store the digital signals of different rows at an addition operation; and
  at the addition operation, when one of the first memory unit and the second memory unit on a same column is defective, allowing the digital signal processing unit to generate the output signal based at least on the signal from the other one of the first memory unit and the second memory unit on the same column.

* * * * *